US009088652B2

(12) United States Patent
Bushey et al.

(10) Patent No.: US 9,088,652 B2
(45) Date of Patent: *Jul. 21, 2015

(54) SYSTEM AND METHOD FOR SPEECH-ENABLED CALL ROUTING

(71) Applicant: AT&T Intellectual Property I, L.P., Atlanta, GA (US)

(72) Inventors: Robert R. Bushey; Benjamin Anthony Knott, Round Rock, TX (US); Sarah Korth, Chicago, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/321,712

(22) Filed: Jul. 1, 2014

(65) Prior Publication Data

US 2014/0314227 A1 Oct. 23, 2014

Related U.S. Application Data

(63) Continuation of application No. 13/934,674, filed on Jul. 3, 2013, now Pat. No. 8,824,659, which is a continuation of application No. 12/787,468, filed on May 26, 2010, now Pat. No. 8,503,662, which is a continuation of application No. 11/032,495, filed on Jan. 10, 2005, now Pat. No. 7,751,551.

(51) Int. Cl.
*H04M 3/00* (2006.01)
*H04M 5/00* (2006.01)
*H04M 3/493* (2006.01)
(Continued)

(52) U.S. Cl.
CPC .............. *H04M 3/4936* (2013.01); *G10L 15/26* (2013.01); *G10L 19/0204* (2013.01); *H04M 3/523* (2013.01); *G10L 19/265* (2013.01); *H04M 2201/60* (2013.01)

(58) Field of Classification Search
USPC ........ 379/265.02, 265.07; 704/231, 251, 255, 704/257
See application file for complete search history.

(56) References Cited

U.S. PATENT DOCUMENTS

| 3,811,012 A | 5/1974 | Barber |
| 4,376,874 A | 3/1983 | Karban et al. |

(Continued)

FOREIGN PATENT DOCUMENTS

| EP | 0424015 A2 | 4/1991 |
| EP | 0424015 A3 | 4/1991 |

(Continued)

OTHER PUBLICATIONS

Supplementary European Search Report, EP0876652, Application No. 97903925, Apr. 14, 1999, 26 pages.

(Continued)

*Primary Examiner* — Quynh Nguyen
(74) *Attorney, Agent, or Firm* — Toler Law Group, PC

(57) ABSTRACT

In a particular embodiment, a method includes determining, at a processor, a first destination based on a communication associated with a source, wherein an account is associated with the source. The method further includes determining a storage value associated with the account, wherein the storage value is associated with an amount of available storage associated with the account. The method further includes routing the communication based on a comparison of the storage value to a threshold.

19 Claims, 3 Drawing Sheets

(51) Int. Cl.
 *G10L 19/02* (2013.01)
 *G10L 15/26* (2006.01)
 *H04M 3/523* (2006.01)
 *G10L 19/26* (2013.01)

(56) References Cited

U.S. PATENT DOCUMENTS

| | | |
|---|---|---|
| 4,555,594 A | 11/1985 | Friedes et al. |
| 4,565,903 A | 1/1986 | Riley |
| 4,577,066 A | 3/1986 | Bimonte et al. |
| 4,618,984 A | 10/1986 | Das et al. |
| 4,677,569 A | 6/1987 | Nakano et al. |
| 4,688,195 A | 8/1987 | Thompson et al. |
| 4,696,028 A | 9/1987 | Morganstein et al. |
| 4,760,593 A | 7/1988 | Shapiro et al. |
| 4,788,715 A | 11/1988 | Lee |
| 4,829,576 A | 5/1989 | Porter |
| 4,922,221 A | 5/1990 | Sato et al. |
| 4,935,927 A | 6/1990 | Kaewell, Jr. et al. |
| 4,953,204 A | 8/1990 | Cuschleg, Jr. et al. |
| 4,962,535 A | 10/1990 | Kimura et al. |
| 4,964,077 A | 10/1990 | Eisen et al. |
| 4,967,405 A | 10/1990 | Upp et al. |
| 4,975,841 A | 12/1990 | Kehnemuyi et al. |
| 4,989,230 A | 1/1991 | Gillig et al. |
| 5,042,006 A | 8/1991 | Flohrer |
| 5,043,718 A | 8/1991 | Shimura |
| 5,049,874 A | 9/1991 | Ishida et al. |
| 5,093,659 A | 3/1992 | Yamada |
| 5,113,430 A | 5/1992 | Richardson, Jr. et al. |
| 5,125,024 A | 6/1992 | Gokcen et al. |
| 5,127,042 A | 6/1992 | Gillig et al. |
| 5,142,695 A | 8/1992 | Roberts et al. |
| 5,155,759 A | 10/1992 | Saegusa et al. |
| 5,187,735 A | 2/1993 | Herrero Garcia et al. |
| 5,206,899 A | 4/1993 | Gupta et al. |
| 5,218,716 A | 6/1993 | Comroe et al. |
| 5,229,701 A | 7/1993 | Leman et al. |
| 5,231,670 A | 7/1993 | Goldhor et al. |
| 5,235,679 A | 8/1993 | Yoshizawa et al. |
| 5,241,678 A | 8/1993 | Futamura et al. |
| 5,247,564 A | 9/1993 | Zicker |
| 5,247,567 A | 9/1993 | Hirano |
| 5,260,988 A | 11/1993 | Schellinger et al. |
| 5,297,183 A | 3/1994 | Bareis et al. |
| 5,299,260 A | 3/1994 | Shaio |
| 5,309,509 A | 5/1994 | Cocklin et al. |
| 5,309,513 A | 5/1994 | Rose |
| 5,311,574 A | 5/1994 | Livanos |
| 5,335,269 A | 8/1994 | Steinlicht |
| 5,353,331 A | 10/1994 | Emery et al. |
| 5,357,564 A | 10/1994 | Gupta et al. |
| 5,367,558 A | 11/1994 | Gillig et al. |
| 5,373,161 A | 12/1994 | Tararine et al. |
| 5,415,416 A | 5/1995 | Scagnelli et al. |
| 5,416,830 A | 5/1995 | MacMillan, Jr. et al. |
| 5,432,845 A | 7/1995 | Burd et al. |
| 5,442,680 A | 8/1995 | Schellinger et al. |
| 5,455,903 A | 10/1995 | Jolissaint et al. |
| 5,469,496 A | 11/1995 | Emery et al. |
| 5,473,677 A | 12/1995 | D'Amato et al. |
| 5,497,373 A | 3/1996 | Hulen et al. |
| 5,509,055 A | 4/1996 | Ehrlich et al. |
| 5,515,366 A | 5/1996 | Chieu et al. |
| 5,521,965 A | 5/1996 | D'Alessio et al. |
| 5,522,046 A | 5/1996 | McMillen et al. |
| 5,530,744 A | 6/1996 | Charalambous et al. |
| 5,530,848 A | 6/1996 | Gilbert et al. |
| 5,546,542 A | 8/1996 | Cosares et al. |
| 5,550,895 A | 8/1996 | Burson et al. |
| 5,553,117 A | 9/1996 | Peterson et al. |
| 5,555,299 A | 9/1996 | Maloney et al. |
| 5,557,518 A | 9/1996 | Rosen |
| 5,559,860 A | 9/1996 | Mizikovsky |
| 5,590,186 A | 12/1996 | Liao et al. |
| 5,594,791 A | 1/1997 | Szlam et al. |
| 5,598,460 A | 1/1997 | Tendler |
| 5,621,789 A | 4/1997 | McCalmont et al. |
| 5,627,971 A | 5/1997 | Miernik |
| 5,630,121 A | 5/1997 | Braden-Harder et al. |
| 5,632,002 A | 5/1997 | Hashimoto et al. |
| 5,636,243 A | 6/1997 | Tanaka |
| 5,644,620 A | 7/1997 | Shimura |
| 5,652,789 A | 7/1997 | Miner et al. |
| 5,657,383 A | 8/1997 | Gerber et al. |
| 5,659,599 A | 8/1997 | Arumainayagam et al. |
| 5,673,308 A | 9/1997 | Akhavan |
| 5,675,707 A | 10/1997 | Gorin et al. |
| 5,675,817 A | 10/1997 | Moughanni et al. |
| 5,729,600 A | 3/1998 | Blaha et al. |
| 5,732,133 A | 3/1998 | Mark |
| 5,732,395 A | 3/1998 | Alexander Silverman |
| 5,735,703 A | 4/1998 | Ballard |
| 5,737,703 A | 4/1998 | Byrne |
| 5,737,723 A | 4/1998 | Riley et al. |
| 5,745,850 A | 4/1998 | Aldermeshian et al. |
| 5,748,147 A | 5/1998 | Bickley et al. |
| 5,754,639 A | 5/1998 | Flockhart et al. |
| 5,754,978 A | 5/1998 | Perez-Mendez et al. |
| 5,761,432 A | 6/1998 | Bergholm et al. |
| 5,787,360 A | 7/1998 | Johnston et al. |
| 5,794,001 A | 8/1998 | Malone et al. |
| 5,797,723 A | 8/1998 | Frost et al. |
| 5,799,279 A | 8/1998 | Gould et al. |
| 5,809,269 A | 9/1998 | Favot et al. |
| 5,828,735 A | 10/1998 | Farfan |
| 5,842,112 A | 11/1998 | Fuller et al. |
| 5,845,062 A | 12/1998 | Branton, Jr. et al. |
| 5,867,495 A | 2/1999 | Elliott et al. |
| 5,867,562 A | 2/1999 | Scherer |
| 5,867,817 A | 2/1999 | Catallo et al. |
| 5,884,262 A | 3/1999 | Wise et al. |
| 5,900,608 A | 5/1999 | Iida |
| 5,905,793 A | 5/1999 | Flockhart et al. |
| 5,909,439 A | 6/1999 | Kuwabara et al. |
| 5,917,903 A | 6/1999 | Jolissaint |
| 5,918,213 A | 6/1999 | Bernard et al. |
| 5,923,646 A | 7/1999 | Mandhyan |
| 5,923,744 A | 7/1999 | Cheng |
| 5,923,745 A | 7/1999 | Hurd |
| 5,930,337 A | 7/1999 | Mohler |
| 5,937,051 A | 8/1999 | Hurd et al. |
| 5,940,476 A | 8/1999 | Morganstein et al. |
| 5,946,377 A | 8/1999 | Wolf |
| 5,946,388 A | 8/1999 | Walker et al. |
| 5,950,133 A | 9/1999 | Bledsoe |
| 5,953,704 A | 9/1999 | McIlroy et al. |
| 5,960,384 A | 9/1999 | Brash |
| 5,974,127 A | 10/1999 | Wernli et al. |
| 5,978,463 A | 11/1999 | Jurkevics et al. |
| 5,987,116 A | 11/1999 | Petrunka et al. |
| 5,991,756 A | 11/1999 | Wu |
| 5,995,839 A | 11/1999 | Coursey et al. |
| 5,995,979 A | 11/1999 | Cochran |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |
| 6,014,439 A | 1/2000 | Walker et al. |
| 6,016,336 A | 1/2000 | Hanson |
| 6,028,601 A | 2/2000 | Machiraju et al. |
| 6,038,293 A | 3/2000 | McNerney et al. |
| 6,038,305 A | 3/2000 | McAllister et al. |
| 6,041,229 A | 3/2000 | Turner |
| 6,044,146 A | 3/2000 | Gisby et al. |
| 6,049,594 A | 4/2000 | Furman et al. |
| 6,061,335 A | 5/2000 | De Vito et al. |
| 6,061,433 A | 5/2000 | Polcyn et al. |
| 6,064,731 A | 5/2000 | Flockhart et al. |
| 6,067,357 A | 5/2000 | Kishinsky et al. |
| 6,069,588 A | 5/2000 | O'Neill, Jr. |
| 6,070,142 A | 5/2000 | McDonough et al. |
| 6,073,031 A | 6/2000 | Helstab et al. |
| 6,085,169 A | 7/2000 | Walker et al. |

(56) References Cited

U.S. PATENT DOCUMENTS

| | | |
|---|---|---|
| 6,085,176 A | 7/2000 | Woolston |
| 6,088,431 A | 7/2000 | LaDue |
| 6,091,949 A | 7/2000 | Sanchez |
| 6,100,885 A | 8/2000 | Donnelly et al. |
| 6,104,798 A | 8/2000 | Lickiss et al. |
| 6,118,796 A | 9/2000 | Best et al. |
| 6,118,866 A | 9/2000 | Shtivelman |
| 6,119,101 A | 9/2000 | Peckover |
| 6,130,938 A | 10/2000 | Erb |
| 6,130,942 A | 10/2000 | Stenlund |
| 6,141,653 A | 10/2000 | Conklin et al. |
| 6,144,938 A | 11/2000 | Surace et al. |
| RE37,001 E | 12/2000 | Morganstein et al. |
| 6,157,655 A | 12/2000 | Shtivelman |
| 6,173,042 B1 | 1/2001 | Wu |
| 6,173,266 B1 | 1/2001 | Marx et al. |
| 6,173,289 B1 | 1/2001 | Sonderegger et al. |
| 6,173,399 B1 | 1/2001 | Gilbrech |
| 6,175,621 B1 | 1/2001 | Begeja |
| 6,181,776 B1 | 1/2001 | Crossley et al. |
| 6,182,052 B1 | 1/2001 | Fulton et al. |
| 6,185,427 B1 | 2/2001 | Krasner et al. |
| 6,188,888 B1 | 2/2001 | Bartle et al. |
| 6,192,398 B1 | 2/2001 | Hunt |
| 6,201,950 B1 | 3/2001 | Fuller et al. |
| 6,202,051 B1 | 3/2001 | Woolston |
| 6,208,854 B1 | 3/2001 | Roberts et al. |
| 6,219,805 B1 | 4/2001 | Jones et al. |
| 6,233,313 B1 | 5/2001 | Farris et al. |
| 6,233,546 B1 | 5/2001 | Datig |
| 6,240,181 B1 | 5/2001 | Tunstall |
| 6,240,297 B1 | 5/2001 | Jadoul |
| 6,246,986 B1 | 6/2001 | Ammicht et al. |
| 6,259,786 B1 | 7/2001 | Gisby |
| 6,260,014 B1 | 7/2001 | Bahl et al. |
| 6,263,071 B1 | 7/2001 | Swan et al. |
| 6,269,153 B1 | 7/2001 | Carpenter et al. |
| 6,269,336 B1 | 7/2001 | Ladd et al. |
| 6,295,432 B1 | 9/2001 | Inoue et al. |
| 6,301,350 B1 | 10/2001 | Henningson et al. |
| 6,314,402 B1 | 11/2001 | Monaco et al. |
| 6,317,439 B1 | 11/2001 | Cardona et al. |
| 6,317,884 B1 | 11/2001 | Eames et al. |
| 6,320,534 B1 | 11/2001 | Goss |
| 6,320,951 B1 | 11/2001 | Shtivelman et al. |
| 6,327,343 B1 | 12/2001 | Epstein et al. |
| 6,327,350 B1 | 12/2001 | Spangler et al. |
| 6,332,082 B1 | 12/2001 | Fuller et al. |
| 6,333,980 B1 | 12/2001 | Hollatz et al. |
| 6,334,127 B1 | 12/2001 | Bieganski et al. |
| 6,353,608 B1 | 3/2002 | Cullers et al. |
| 6,356,936 B1 | 3/2002 | Donoho et al. |
| 6,362,778 B2 | 3/2002 | Neher |
| 6,366,658 B1 | 4/2002 | Bjornberg et al. |
| 6,366,668 B1 | 4/2002 | Borst et al. |
| 6,373,817 B1 | 4/2002 | Kung et al. |
| 6,377,662 B1 | 4/2002 | Hunt et al. |
| 6,381,329 B1 | 4/2002 | Uppaluru et al. |
| 6,385,584 B1 | 5/2002 | McAllister et al. |
| 6,389,400 B1 | 5/2002 | Bushey et al. |
| 6,400,804 B1 | 6/2002 | Bilder |
| 6,400,996 B1 | 6/2002 | Hoffberg et al. |
| 6,405,159 B2 | 6/2002 | Bushey et al. |
| 6,411,687 B1 | 6/2002 | Bohacek et al. |
| 6,411,692 B1 | 6/2002 | Scherer |
| 6,414,966 B1 | 7/2002 | Kulkarni et al. |
| 6,418,424 B1 | 7/2002 | Hoffberg et al. |
| 6,421,433 B1 | 7/2002 | Arsenault |
| 6,424,840 B1 | 7/2002 | Fitch et al. |
| 6,434,524 B1 | 8/2002 | Weber |
| 6,434,546 B1 | 8/2002 | Williamowski et al. |
| 6,434,687 B1 | 8/2002 | Huppenthal |
| 6,438,520 B1 | 8/2002 | Curt et al. |
| 6,442,247 B1 | 8/2002 | Garcia |
| 6,449,226 B1 | 9/2002 | Kumagai |
| 6,466,654 B1 | 10/2002 | Cooper et al. |
| 6,480,593 B1 | 11/2002 | Munday et al. |
| 6,483,895 B2 | 11/2002 | Bixler et al. |
| 6,483,897 B1 | 11/2002 | Millrod |
| 6,483,899 B2 | 11/2002 | Agraharam et al. |
| 6,484,027 B1 | 11/2002 | Mauney et al. |
| 6,496,567 B1 | 12/2002 | Bjornberg et al. |
| 6,496,836 B1 | 12/2002 | Ronchi et al. |
| 6,501,753 B1 | 12/2002 | Lin et al. |
| 6,502,077 B1 | 12/2002 | Speicher |
| 6,505,055 B1 | 1/2003 | Kahn et al. |
| 6,509,833 B2 | 1/2003 | Tate |
| 6,510,414 B1 | 1/2003 | Chaves |
| 6,513,010 B1 | 1/2003 | Lewin et al. |
| 6,516,060 B1 | 2/2003 | Foladare et al. |
| 6,519,562 B1 | 2/2003 | Phillips et al. |
| 6,522,742 B1 | 2/2003 | Crosby et al. |
| 6,526,126 B1 | 2/2003 | Morganstein et al. |
| 6,529,871 B1 | 3/2003 | Kanevsky et al. |
| 6,532,444 B1 | 3/2003 | Weber |
| 6,535,596 B1 | 3/2003 | Frey et al. |
| 6,538,666 B1 | 3/2003 | Ozawa et al. |
| 6,546,087 B2 | 4/2003 | Shaffer et al. |
| 6,553,112 B2 | 4/2003 | Ishikawa |
| 6,553,113 B1 | 4/2003 | Dhir et al. |
| 6,556,671 B1 | 4/2003 | Beauvois |
| 6,560,329 B1 | 5/2003 | Draginich et al. |
| 6,570,967 B2 | 5/2003 | Katz |
| 6,571,240 B1 | 5/2003 | Ho et al. |
| 6,574,213 B1 | 6/2003 | Anandakumar et al. |
| 6,574,470 B1 | 6/2003 | Chow et al. |
| 6,574,599 B1 | 6/2003 | Lim et al. |
| 6,577,718 B1 | 6/2003 | Kalmanek, Jr. et al. |
| 6,581,033 B1 | 6/2003 | Reynar et al. |
| 6,584,180 B2 | 6/2003 | Nemoto |
| 6,584,191 B1 | 6/2003 | McPartlan et al. |
| 6,587,475 B1 | 7/2003 | Przygienda |
| 6,587,556 B1 | 7/2003 | Judkins et al. |
| 6,587,558 B2 | 7/2003 | Lo |
| 6,587,683 B1 | 7/2003 | Chow et al. |
| 6,589,136 B2 | 7/2003 | Ephraim et al. |
| 6,594,470 B1 | 7/2003 | Barnes et al. |
| 6,597,783 B1 | 7/2003 | Tada et al. |
| 6,598,016 B1 | 7/2003 | Zavoli et al. |
| 6,598,021 B1 | 7/2003 | Shambaugh et al. |
| 6,598,136 B1 | 7/2003 | Norrod et al. |
| 6,600,734 B1 | 7/2003 | Gernert et al. |
| 6,600,736 B1 | 7/2003 | Ball et al. |
| 6,601,014 B1 | 7/2003 | Dempsey |
| 6,601,027 B1 | 7/2003 | Wright et al. |
| 6,603,837 B1 | 8/2003 | Kesanupalli et al. |
| 6,603,854 B1 | 8/2003 | Judkins et al. |
| 6,606,744 B1 | 8/2003 | Mikurak |
| 6,611,681 B2 | 8/2003 | Henderson |
| 6,614,206 B1 | 9/2003 | Wong et al. |
| 6,614,781 B1 | 9/2003 | Elliott et al. |
| 6,614,784 B1 | 9/2003 | Glitho et al. |
| 6,615,209 B1 | 9/2003 | Gomes et al. |
| 6,615,248 B1 | 9/2003 | Smith |
| 6,615,249 B2 | 9/2003 | Schulte Am Hülse |
| 6,625,423 B1 | 9/2003 | Wang |
| 6,631,186 B1 | 10/2003 | Adams et al. |
| 6,650,088 B1 | 11/2003 | Webb et al. |
| 6,653,722 B2 | 11/2003 | Blalock et al. |
| 6,654,602 B1 | 11/2003 | Fye et al. |
| 6,662,163 B1 | 12/2003 | Albayrak et al. |
| 6,668,241 B2 | 12/2003 | Chen et al. |
| 6,678,355 B2 | 1/2004 | Eringis et al. |
| 6,678,360 B1 | 1/2004 | Katz |
| 6,678,718 B1 | 1/2004 | Khouri et al. |
| 6,680,935 B1 | 1/2004 | Kung et al. |
| 6,681,001 B1 | 1/2004 | Clayton et al. |
| 6,690,788 B1 | 2/2004 | Bauer et al. |
| 6,694,012 B1 | 2/2004 | Posthuma |
| 6,694,482 B1 | 2/2004 | Arellano et al. |
| 6,697,458 B1 | 2/2004 | Kunjibettu |
| 6,697,460 B2 | 2/2004 | Knott et al. |
| 6,697,467 B1 | 2/2004 | Schultz et al. |
| 6,697,806 B1 | 2/2004 | Cook |

(56) References Cited

U.S. PATENT DOCUMENTS

| | | |
|---|---|---|
| 6,700,972 B1 | 3/2004 | McHugh et al. |
| 6,704,404 B1 | 3/2004 | Burnett |
| 6,704,580 B1 | 3/2004 | Fintel |
| 6,707,789 B1 | 3/2004 | Arslan et al. |
| 6,711,253 B1 | 3/2004 | Prabhaker |
| 6,714,631 B1 | 3/2004 | Martin et al. |
| 6,714,643 B1 | 3/2004 | Gargeya et al. |
| 6,718,023 B1 | 4/2004 | Zolotov |
| 6,721,416 B1 | 4/2004 | Farrell |
| 6,721,882 B1 | 4/2004 | Mbarki |
| 6,725,199 B2 | 4/2004 | Brittan et al. |
| 6,731,625 B1 | 5/2004 | Eastep et al. |
| 6,731,722 B2 | 5/2004 | Coffey |
| 6,732,151 B1 | 5/2004 | Tobias et al. |
| 6,735,432 B1 | 5/2004 | Jarett et al. |
| 6,738,082 B1 | 5/2004 | Dong et al. |
| 6,738,473 B1 | 5/2004 | Burg et al. |
| 6,744,861 B1 | 6/2004 | Pershan et al. |
| 6,744,877 B1 | 6/2004 | Edwards |
| 6,745,165 B2 | 6/2004 | Lewis et al. |
| 6,751,306 B2 | 6/2004 | Himmel et al. |
| 6,751,591 B1 | 6/2004 | Gorin et al. |
| 6,757,306 B1 | 6/2004 | Klish, II et al. |
| 6,763,095 B1 | 7/2004 | Cermak et al. |
| 6,766,175 B2 | 7/2004 | Uchiyama |
| 6,766,320 B1 | 7/2004 | Wang et al. |
| 6,775,359 B1 | 8/2004 | Ron et al. |
| 6,778,643 B1 | 8/2004 | Bushey et al. |
| 6,782,412 B2 | 8/2004 | Brophy et al. |
| 6,792,096 B2 | 9/2004 | Martin et al. |
| 6,795,806 B1 | 9/2004 | Lewis et al. |
| 6,798,768 B1 | 9/2004 | Gallick et al. |
| 6,798,876 B1 | 9/2004 | Bala |
| 6,801,520 B2 | 10/2004 | Philonenko |
| 6,801,751 B1 | 10/2004 | Wood et al. |
| 6,807,274 B2 | 10/2004 | Joseph et al. |
| 6,823,307 B1 | 11/2004 | Steinbiss et al. |
| 6,826,264 B2 | 11/2004 | Valco et al. |
| 6,831,932 B1 | 12/2004 | Boyle et al. |
| 6,832,224 B2 | 12/2004 | Gilmour |
| 6,836,760 B1 | 12/2004 | Bellegarda et al. |
| 6,842,504 B2 | 1/2005 | Mills et al. |
| 6,847,711 B2 | 1/2005 | Knott et al. |
| 6,847,715 B1 | 1/2005 | Swartz |
| 6,850,611 B1 | 2/2005 | Chalk |
| 6,853,722 B2 | 2/2005 | Joseph et al. |
| 6,853,966 B2 | 2/2005 | Bushey et al. |
| 6,856,806 B1 | 2/2005 | Bosik et al. |
| 6,859,529 B2 | 2/2005 | Duncan et al. |
| 6,871,179 B1 | 3/2005 | Kist et al. |
| 6,871,212 B2 | 3/2005 | Khouri et al. |
| 6,873,693 B1 | 3/2005 | Langseth et al. |
| 6,879,683 B1 | 4/2005 | Fain et al. |
| 6,882,641 B1 | 4/2005 | Gallick et al. |
| 6,882,723 B1 | 4/2005 | Peterson et al. |
| 6,885,734 B1 | 4/2005 | Eberle et al. |
| 6,891,932 B2 | 5/2005 | Bhargava et al. |
| 6,892,083 B2 | 5/2005 | Shostak |
| 6,892,169 B1 | 5/2005 | Campbell et al. |
| 6,895,083 B1 | 5/2005 | Bers et al. |
| 6,895,532 B2 | 5/2005 | Raynham |
| 6,901,366 B1 | 5/2005 | Kuhn et al. |
| 6,907,119 B2 | 6/2005 | Case et al. |
| 6,909,708 B1 | 6/2005 | Krishnaswamy et al. |
| 6,914,974 B2 | 7/2005 | Bonnin |
| 6,915,246 B2 | 7/2005 | Gusler et al. |
| 6,922,689 B2 | 7/2005 | Shtivelman |
| 6,925,155 B2 | 8/2005 | Reynolds et al. |
| 6,925,432 B2 | 8/2005 | Lee et al. |
| 6,937,975 B1 | 8/2005 | Elworthy |
| 6,944,592 B1 | 9/2005 | Pickering |
| 6,944,593 B1 | 9/2005 | Kuzunuki et al. |
| 6,963,983 B2 | 11/2005 | Munson et al. |
| 6,964,023 B2 | 11/2005 | Maes et al. |
| 6,970,554 B1 | 11/2005 | Peterson et al. |
| 6,978,154 B1 | 12/2005 | Ospalak et al. |
| 6,978,163 B2 | 12/2005 | Dyer et al. |
| 6,999,755 B2 | 2/2006 | Park |
| 7,003,079 B1 | 2/2006 | McCarthy et al. |
| 7,006,605 B1 | 2/2006 | Morganstein et al. |
| 7,006,607 B2 | 2/2006 | Garcia |
| 7,013,112 B2 | 3/2006 | Haller et al. |
| 7,013,464 B2 | 3/2006 | Osborn |
| 7,016,849 B2 | 3/2006 | Arnold et al. |
| 7,020,256 B2 | 3/2006 | Jain et al. |
| 7,024,368 B1 | 4/2006 | Matheson |
| 7,027,586 B2 | 4/2006 | Bushey et al. |
| 7,027,975 B1 | 4/2006 | Pazandak et al. |
| 7,031,444 B2 | 4/2006 | Shen et al. |
| 7,031,908 B1 | 4/2006 | Huang et al. |
| 7,035,388 B2 | 4/2006 | Kurosaki |
| 7,039,166 B1 | 5/2006 | Peterson et al. |
| 7,043,435 B2 | 5/2006 | Knott et al. |
| 7,050,936 B2 | 5/2006 | Levy et al. |
| 7,062,029 B2 | 6/2006 | Lund |
| 7,062,505 B2 | 6/2006 | Lane et al. |
| 7,065,201 B2 | 6/2006 | Bushey et al. |
| 7,072,457 B2 | 7/2006 | Brown et al. |
| 7,072,643 B2 | 7/2006 | Pines et al. |
| 7,072,659 B2 | 7/2006 | White, Jr. |
| 7,076,049 B2 | 7/2006 | Bushey et al. |
| 7,076,695 B2 | 7/2006 | McGee et al. |
| 7,092,370 B2 | 8/2006 | Jiang et al. |
| 7,092,888 B1 | 8/2006 | McCarthy et al. |
| 7,092,901 B2 | 8/2006 | Davis et al. |
| 7,095,827 B2 | 8/2006 | Guedalia |
| 7,095,842 B2 | 8/2006 | Brown et al. |
| 7,102,780 B2 | 9/2006 | Watanabe |
| 7,103,165 B2 | 9/2006 | Baniak et al. |
| 7,103,542 B2 | 9/2006 | Doyle |
| 7,106,850 B2 | 9/2006 | Campbell et al. |
| 7,110,512 B2 | 9/2006 | Maropis et al. |
| 7,110,949 B2 | 9/2006 | Bushey et al. |
| 7,124,059 B2 | 10/2006 | Wetzer et al. |
| 7,127,398 B1 | 10/2006 | Yamagishi et al. |
| 7,127,400 B2 | 10/2006 | Koch |
| 7,130,411 B2 | 10/2006 | Brown et al. |
| 7,131,577 B2 | 11/2006 | Obara et al. |
| 7,133,504 B2 | 11/2006 | Fostick |
| 7,133,828 B2 | 11/2006 | Scarano et al. |
| 7,139,390 B2 | 11/2006 | Brown et al. |
| 7,142,652 B2 | 11/2006 | Ho |
| 7,149,525 B2 | 12/2006 | White, Jr. |
| 7,177,397 B2 | 2/2007 | McCalmont et al. |
| 7,177,792 B2 | 2/2007 | Knight et al. |
| 7,184,534 B2 | 2/2007 | Birch et al. |
| 7,184,540 B2 | 2/2007 | Dezonno et al. |
| 7,191,435 B2 | 3/2007 | Lau et al. |
| 7,197,130 B2 | 3/2007 | Paden et al. |
| 7,200,614 B2 | 4/2007 | Reid et al. |
| 7,206,400 B2 | 4/2007 | Dezonno et al. |
| 7,215,745 B2 | 5/2007 | Peters |
| 7,215,759 B2 | 5/2007 | Brown et al. |
| 7,224,792 B2 | 5/2007 | Fusco |
| 7,231,343 B1 | 6/2007 | Treadgold et al. |
| 7,231,384 B2 | 6/2007 | Wu et al. |
| 7,233,908 B1 | 6/2007 | Nelson |
| 7,233,980 B1 | 6/2007 | Holden et al. |
| 7,242,751 B2 | 7/2007 | Bushey et al. |
| 7,245,711 B2 | 7/2007 | Margolis |
| 7,245,716 B2 | 7/2007 | Brown et al. |
| 7,260,537 B2 | 8/2007 | Creamer et al. |
| 7,272,217 B1 | 9/2007 | Kocharlakota |
| 7,277,922 B1 | 10/2007 | Contractor |
| 7,277,924 B1 | 10/2007 | Wichmann et al. |
| 7,287,214 B1 | 10/2007 | Jenkins et al. |
| 7,313,229 B1 | 12/2007 | Sherwood |
| 7,317,787 B2 | 1/2008 | Crockett et al. |
| 7,336,775 B2 | 2/2008 | Tanaka et al. |
| 7,346,152 B2 | 3/2008 | Paden et al. |
| 7,346,507 B1 | 3/2008 | Natarajan et al. |
| 7,349,843 B1 | 3/2008 | Beck |
| 7,353,033 B2 | 4/2008 | Kwon |
| 7,356,475 B2 | 4/2008 | Novack et al. |

(56) References Cited

U.S. PATENT DOCUMENTS

| | | |
|---|---|---|
| 7,356,685 B2 | 4/2008 | Backman |
| 7,369,653 B2 | 5/2008 | Dezonno et al. |
| 7,370,086 B2 | 5/2008 | Kroeker et al. |
| 7,379,867 B2 | 5/2008 | Chelba et al. |
| 7,379,876 B2 | 5/2008 | Nakata |
| 7,379,886 B1 | 5/2008 | Zaring et al. |
| 7,415,101 B2 | 8/2008 | Bushey et al. |
| 7,421,389 B2 | 9/2008 | Reynolds et al. |
| 7,430,554 B1 | 9/2008 | Heisinger, Jr. |
| 7,443,963 B2 | 10/2008 | Scherer |
| 7,447,299 B1 | 11/2008 | Partovi et al. |
| 7,447,662 B2 | 11/2008 | Gibson |
| 7,450,698 B2 | 11/2008 | Bushey et al. |
| 7,454,005 B2 | 11/2008 | Malik |
| 7,460,650 B2 | 12/2008 | Bushey et al. |
| 7,487,095 B2 | 2/2009 | Hill et al. |
| 7,487,112 B2 | 2/2009 | Barnes, Jr. |
| 7,506,241 B2 | 3/2009 | Chefalas et al. |
| 7,512,545 B2 | 3/2009 | Knott et al. |
| 7,516,190 B2 | 4/2009 | Kurganov |
| 7,545,925 B2 | 6/2009 | Williams |
| 7,551,723 B2 | 6/2009 | Mills et al. |
| 7,573,990 B2 | 8/2009 | Galvin |
| 7,580,837 B2 | 8/2009 | Bushey et al. |
| 7,602,898 B2 | 10/2009 | Klein et al. |
| 7,602,899 B1 | 10/2009 | Thenthiruperai |
| 7,616,944 B2 | 11/2009 | Gustavsson et al. |
| 7,620,159 B2 | 11/2009 | Pasquale et al. |
| 7,620,168 B2 | 11/2009 | Ekstrom |
| 7,623,632 B2 | 11/2009 | Bushey et al. |
| 7,627,096 B2 | 12/2009 | Bushey et al. |
| 7,627,109 B2 | 12/2009 | Mitra |
| 7,636,432 B2 | 12/2009 | Bushey et al. |
| 7,647,582 B2 | 1/2010 | Krishnaswamy et al. |
| 7,657,005 B2 | 2/2010 | Chang |
| 7,657,020 B2 | 2/2010 | Bushey et al. |
| 7,660,233 B2 | 2/2010 | Paden et al. |
| 7,660,715 B1 | 2/2010 | Thambiratnam |
| 7,668,889 B2 | 2/2010 | Edwards et al. |
| 7,684,989 B1 | 3/2010 | Collins et al. |
| 7,685,270 B1 | 3/2010 | Vermeulen et al. |
| 7,702,532 B2 | 4/2010 | Vigil |
| 7,720,203 B2 | 5/2010 | Bushey et al. |
| 7,724,889 B2 | 5/2010 | Bushey et al. |
| 7,739,717 B1 | 6/2010 | Kuether et al. |
| 7,751,551 B2 | 7/2010 | Bushey et al. |
| RE41,608 E | 8/2010 | Blair et al. |
| 7,783,029 B2 | 8/2010 | Whitecotten et al. |
| 7,864,942 B2 | 1/2011 | Knott et al. |
| 7,881,656 B2 | 2/2011 | Khedouri et al. |
| 7,900,542 B2 | 3/2011 | Kapolnek |
| 7,933,399 B2 | 4/2011 | Knott et al. |
| 7,936,861 B2 | 5/2011 | Knott et al. |
| 7,939,432 B2 | 5/2011 | Chiang et al. |
| 7,966,176 B2 | 6/2011 | Bushey et al. |
| 8,005,204 B2 | 8/2011 | Bushey et al. |
| 8,051,086 B2 | 11/2011 | Jeffs et al. |
| 8,090,086 B2 | 1/2012 | Chang |
| 8,090,091 B2 | 1/2012 | Ekstrom |
| 8,130,936 B2 | 3/2012 | Kortum et al. |
| 8,139,727 B2 | 3/2012 | Awad et al. |
| 8,165,281 B2 | 4/2012 | Joseph et al. |
| 8,170,197 B2 | 5/2012 | Odinak |
| 8,175,253 B2 | 5/2012 | Knott et al. |
| 8,223,954 B2 | 7/2012 | Dallessandro et al. |
| 8,295,469 B2 | 10/2012 | Bushey et al. |
| 8,306,192 B2 | 11/2012 | Bushey et al. |
| 8,321,446 B2 | 11/2012 | Edwards et al. |
| 8,401,851 B2 | 3/2013 | Bushey et al. |
| 8,488,770 B2 | 7/2013 | Mahoney et al. |
| 8,503,662 B2 | 8/2013 | Bushey et al. |
| 2001/0011211 A1 | 8/2001 | Bushey et al. |
| 2001/0014599 A1 | 8/2001 | Henderson |
| 2001/0018672 A1 | 8/2001 | Petters et al. |
| 2001/0019604 A1 | 9/2001 | Joyce et al. |
| 2001/0019955 A1 | 9/2001 | Henderson |
| 2001/0021948 A1 | 9/2001 | Khouri et al. |
| 2001/0024497 A1 | 9/2001 | Campbell et al. |
| 2001/0026608 A1 | 10/2001 | Beyda et al. |
| 2001/0032075 A1 | 10/2001 | Yamamoto |
| 2001/0032211 A1 | 10/2001 | Kuzumaki |
| 2001/0032229 A1 | 10/2001 | Hulls et al. |
| 2001/0033570 A1 | 10/2001 | Makam et al. |
| 2001/0034662 A1 | 10/2001 | Morris |
| 2002/0007303 A1 | 1/2002 | Brookler et al. |
| 2002/0016757 A1 | 2/2002 | Johnson et al. |
| 2002/0023251 A1 | 2/2002 | Nasr et al. |
| 2002/0026394 A1 | 2/2002 | Savage et al. |
| 2002/0032675 A1 | 3/2002 | Williamowski et al. |
| 2002/0046030 A1 | 4/2002 | Haritsa et al. |
| 2002/0049874 A1 | 4/2002 | Kimura |
| 2002/0055975 A1 | 5/2002 | Petrovykh |
| 2002/0056000 A1 | 5/2002 | Albert Coussement |
| 2002/0057678 A1 | 5/2002 | Jiang et al. |
| 2002/0059164 A1 | 5/2002 | Shtivelman |
| 2002/0059169 A1 | 5/2002 | Quarterman et al. |
| 2002/0064149 A1 | 5/2002 | Elliott et al. |
| 2002/0067714 A1 | 6/2002 | Crain et al. |
| 2002/0067820 A1 | 6/2002 | Benson et al. |
| 2002/0073434 A1 | 6/2002 | Pience |
| 2002/0080025 A1 | 6/2002 | Beattie |
| 2002/0087310 A1 | 7/2002 | Lee et al. |
| 2002/0087316 A1 | 7/2002 | Lee et al. |
| 2002/0087385 A1 | 7/2002 | Vincent |
| 2002/0087558 A1 | 7/2002 | Bailey et al. |
| 2002/0091617 A1 | 7/2002 | Keith |
| 2002/0106065 A1 | 8/2002 | Joyce et al. |
| 2002/0111190 A1 | 8/2002 | Harrison et al. |
| 2002/0114432 A1 | 8/2002 | Shaffer et al. |
| 2002/0115480 A1 | 8/2002 | Huang |
| 2002/0116174 A1 | 8/2002 | Lee et al. |
| 2002/0116336 A1 | 8/2002 | Diacakis et al. |
| 2002/0119800 A1 | 8/2002 | Jaggers et al. |
| 2002/0122544 A1 | 9/2002 | Williams et al. |
| 2002/0133394 A1 | 9/2002 | Bushey et al. |
| 2002/0133413 A1 | 9/2002 | Chang et al. |
| 2002/0135618 A1 | 9/2002 | Maes et al. |
| 2002/0137472 A1 | 9/2002 | Quinn et al. |
| 2002/0143548 A1 | 10/2002 | Korall et al. |
| 2002/0156699 A1 | 10/2002 | Gray et al. |
| 2002/0165732 A1 | 11/2002 | Ezzeddine et al. |
| 2002/0169606 A1 | 11/2002 | Bantz et al. |
| 2002/0178005 A1 | 11/2002 | Dusan et al. |
| 2002/0181442 A1 | 12/2002 | Rajani |
| 2002/0188438 A1 | 12/2002 | Knight et al. |
| 2002/0196277 A1 | 12/2002 | Bushey et al. |
| 2002/0198714 A1 | 12/2002 | Zhou |
| 2002/0198967 A1 | 12/2002 | Iwanojko et al. |
| 2003/0003900 A1 | 1/2003 | Goss et al. |
| 2003/0007609 A1 | 1/2003 | Yuen et al. |
| 2003/0007620 A1 | 1/2003 | Elsey et al. |
| 2003/0009339 A1 | 1/2003 | Yuen et al. |
| 2003/0014335 A1 | 1/2003 | Lecheler-Moore et al. |
| 2003/0018659 A1 | 1/2003 | Fuks et al. |
| 2003/0026409 A1 | 2/2003 | Bushey et al. |
| 2003/0028498 A1 | 2/2003 | Hayes-Roth |
| 2003/0035381 A1 | 2/2003 | Chen et al. |
| 2003/0035516 A1 | 2/2003 | Guedalia |
| 2003/0039242 A1 | 2/2003 | Moore, Jr. |
| 2003/0048195 A1 | 3/2003 | Trossen |
| 2003/0064720 A1 | 4/2003 | Valins et al. |
| 2003/0069937 A1 | 4/2003 | Khouri et al. |
| 2003/0092451 A1 | 5/2003 | Holloway et al. |
| 2003/0095651 A1 | 5/2003 | Book et al. |
| 2003/0097428 A1 | 5/2003 | Afkhami et al. |
| 2003/0103619 A1 | 6/2003 | Brown et al. |
| 2003/0108183 A1 | 6/2003 | Dhir et al. |
| 2003/0112956 A1 | 6/2003 | Brown et al. |
| 2003/0114105 A1 | 6/2003 | Haller et al. |
| 2003/0115257 A1 | 6/2003 | Zyrko et al. |
| 2003/0115289 A1 | 6/2003 | Chinn et al. |
| 2003/0118159 A1 | 6/2003 | Shen et al. |
| 2003/0125075 A1 | 7/2003 | Klovborg |
| 2003/0125945 A1 | 7/2003 | Doyle |

(56) References Cited

U.S. PATENT DOCUMENTS

| | | |
|---|---|---|
| 2003/0130841 A1 | 7/2003 | Bangalore et al. |
| 2003/0130864 A1 | 7/2003 | Ho et al. |
| 2003/0133421 A1 | 7/2003 | Sundar et al. |
| 2003/0143981 A1 | 7/2003 | Kortum et al. |
| 2003/0144846 A1 | 7/2003 | Denenberg et al. |
| 2003/0144919 A1 | 7/2003 | Trompette et al. |
| 2003/0149653 A1 | 8/2003 | Penney et al. |
| 2003/0154184 A1 | 8/2003 | Chee et al. |
| 2003/0156133 A1 | 8/2003 | Martin et al. |
| 2003/0165223 A1 | 9/2003 | Timmins et al. |
| 2003/0179876 A1 | 9/2003 | Fox et al. |
| 2003/0181202 A1 | 9/2003 | Link, II et al. |
| 2003/0187632 A1 | 10/2003 | Menich |
| 2003/0187732 A1 | 10/2003 | Seta |
| 2003/0187773 A1 | 10/2003 | Santos et al. |
| 2003/0187865 A1 | 10/2003 | Frisina |
| 2003/0191648 A1 | 10/2003 | Knott et al. |
| 2003/0194063 A1 | 10/2003 | Martin et al. |
| 2003/0195753 A1 | 10/2003 | Homuth |
| 2003/0200298 A1 | 10/2003 | Su et al. |
| 2003/0202640 A1 | 10/2003 | Knott et al. |
| 2003/0202643 A1 | 10/2003 | Joseph et al. |
| 2003/0202649 A1 | 10/2003 | Haug, Jr. et al. |
| 2003/0204435 A1 | 10/2003 | McQuilkin et al. |
| 2003/0212558 A1 | 11/2003 | Matula |
| 2003/0228007 A1 | 12/2003 | Kurosaki |
| 2003/0235282 A1 | 12/2003 | Sichelman et al. |
| 2003/0235287 A1 | 12/2003 | Margolis |
| 2004/0005047 A1 | 1/2004 | Joseph et al. |
| 2004/0006473 A1 | 1/2004 | Mills et al. |
| 2004/0018774 A1 | 1/2004 | Long et al. |
| 2004/0028213 A1 | 2/2004 | Goss |
| 2004/0030649 A1 | 2/2004 | Nelson et al. |
| 2004/0032484 A1 | 2/2004 | Halttunen |
| 2004/0032862 A1 | 2/2004 | Schoeneberger et al. |
| 2004/0032935 A1 | 2/2004 | Mills et al. |
| 2004/0037401 A1 | 2/2004 | Dow et al. |
| 2004/0042592 A1 | 3/2004 | Knott et al. |
| 2004/0044950 A1 | 3/2004 | Mills et al. |
| 2004/0047453 A1 | 3/2004 | Fraser |
| 2004/0063424 A1 | 4/2004 | Silberstein et al. |
| 2004/0066401 A1 | 4/2004 | Bushey et al. |
| 2004/0066416 A1 | 4/2004 | Knott et al. |
| 2004/0066776 A1 | 4/2004 | Ishidoshiro |
| 2004/0072544 A1 | 4/2004 | Alexis |
| 2004/0073569 A1 | 4/2004 | Knott et al. |
| 2004/0083206 A1 | 4/2004 | Wu et al. |
| 2004/0083479 A1 | 4/2004 | Bondarenko et al. |
| 2004/0088285 A1 | 5/2004 | Martin et al. |
| 2004/0101127 A1 | 5/2004 | Dezonno et al. |
| 2004/0103017 A1 | 5/2004 | Reed et al. |
| 2004/0109555 A1 | 6/2004 | Williams |
| 2004/0111269 A1 | 6/2004 | Koch |
| 2004/0111479 A1 | 6/2004 | Borden et al. |
| 2004/0116073 A1 | 6/2004 | Mauney et al. |
| 2004/0117185 A1 | 6/2004 | Scarano et al. |
| 2004/0120473 A1 | 6/2004 | Birch et al. |
| 2004/0120492 A1 | 6/2004 | Lew et al. |
| 2004/0125937 A1 | 7/2004 | Turcan et al. |
| 2004/0125938 A1 | 7/2004 | Turcan et al. |
| 2004/0125940 A1 | 7/2004 | Turcan et al. |
| 2004/0127241 A1 | 7/2004 | Shostak |
| 2004/0128624 A1 | 7/2004 | Arellano et al. |
| 2004/0156491 A1 | 8/2004 | Reding et al. |
| 2004/0161078 A1 | 8/2004 | Knott et al. |
| 2004/0161094 A1 | 8/2004 | Martin et al. |
| 2004/0161096 A1 | 8/2004 | Knott et al. |
| 2004/0162724 A1 | 8/2004 | Hill et al. |
| 2004/0174980 A1 | 9/2004 | Knott et al. |
| 2004/0199394 A1 | 10/2004 | Kuzunuki et al. |
| 2004/0202309 A1 | 10/2004 | Baggenstoss et al. |
| 2004/0203374 A1 | 10/2004 | Zilliacus |
| 2004/0204056 A1 | 10/2004 | Phelps, III |
| 2004/0213212 A1 | 10/2004 | Reding et al. |
| 2004/0230438 A1 | 11/2004 | Pasquale et al. |
| 2004/0230506 A1 | 11/2004 | Casco-Arias et al. |
| 2004/0240635 A1 | 12/2004 | Bushey et al. |
| 2004/0243568 A1 | 12/2004 | Wang et al. |
| 2004/0259541 A1 | 12/2004 | Hicks, III et al. |
| 2004/0264677 A1 | 12/2004 | Horvitz et al. |
| 2004/0266425 A1 | 12/2004 | Gonsalves et al. |
| 2005/0008141 A1 | 1/2005 | Kortum et al. |
| 2005/0015197 A1 | 1/2005 | Ohtsuji et al. |
| 2005/0015256 A1 | 1/2005 | Kargman |
| 2005/0015744 A1 | 1/2005 | Bushey et al. |
| 2005/0018825 A1 | 1/2005 | Ho |
| 2005/0020236 A1 | 1/2005 | Mauney et al. |
| 2005/0021567 A1 | 1/2005 | Holenstein et al. |
| 2005/0027535 A1 | 2/2005 | Martin et al. |
| 2005/0032475 A1 | 2/2005 | Mauney et al. |
| 2005/0041647 A1 | 2/2005 | Stinnie |
| 2005/0041796 A1 | 2/2005 | Joseph et al. |
| 2005/0047578 A1 | 3/2005 | Knott et al. |
| 2005/0049874 A1 | 3/2005 | Coffman et al. |
| 2005/0049940 A1 | 3/2005 | Tengler et al. |
| 2005/0054335 A1 | 3/2005 | Pearson et al. |
| 2005/0055216 A1 | 3/2005 | Bushey et al. |
| 2005/0055599 A1 | 3/2005 | Bravo et al. |
| 2005/0058264 A1 | 3/2005 | Joseph et al. |
| 2005/0060200 A1 | 3/2005 | Kobylevsky et al. |
| 2005/0063360 A1 | 3/2005 | Lowmaster |
| 2005/0063528 A1 | 3/2005 | Pearson et al. |
| 2005/0064853 A1 | 3/2005 | Radpour |
| 2005/0064855 A1 | 3/2005 | Russell |
| 2005/0066416 A1 | 3/2005 | Ma |
| 2005/0075894 A1 | 4/2005 | Bushey et al. |
| 2005/0075984 A1 | 4/2005 | Bourrieres et al. |
| 2005/0078805 A1 | 4/2005 | Mills et al. |
| 2005/0080630 A1 | 4/2005 | Mills et al. |
| 2005/0080667 A1 | 4/2005 | Knott et al. |
| 2005/0081696 A1 | 4/2005 | Kapolnek |
| 2005/0096024 A1 | 5/2005 | Bicker et al. |
| 2005/0097034 A1 | 5/2005 | Loeger et al. |
| 2005/0102141 A1 | 5/2005 | Chikuri |
| 2005/0111653 A1 | 5/2005 | Joyce et al. |
| 2005/0113077 A1 | 5/2005 | Bushnell et al. |
| 2005/0125232 A1 | 6/2005 | Gadd |
| 2005/0131708 A1 | 6/2005 | Palma et al. |
| 2005/0131892 A1 | 6/2005 | Knott et al. |
| 2005/0132262 A1 | 6/2005 | Bushey et al. |
| 2005/0135575 A1 | 6/2005 | Haskey et al. |
| 2005/0135595 A1 | 6/2005 | Bushey et al. |
| 2005/0141479 A1 | 6/2005 | Ozugur et al. |
| 2005/0141692 A1 | 6/2005 | Scherer et al. |
| 2005/0141694 A1 | 6/2005 | Wengrovitz |
| 2005/0147218 A1 | 7/2005 | Novack et al. |
| 2005/0152530 A1 | 7/2005 | Pence et al. |
| 2005/0152531 A1 | 7/2005 | Hamilton, II et al. |
| 2005/0161002 A1 | 7/2005 | Robinson |
| 2005/0169441 A1 | 8/2005 | Yacoub et al. |
| 2005/0169449 A1 | 8/2005 | Coughlin, Jr. et al. |
| 2005/0169453 A1 | 8/2005 | Knott et al. |
| 2005/0171877 A1 | 8/2005 | Weiss |
| 2005/0172033 A1 | 8/2005 | Mathew et al. |
| 2005/0172148 A1 | 8/2005 | Ying |
| 2005/0195961 A1 | 9/2005 | Pasquale et al. |
| 2005/0201531 A1 | 9/2005 | Kanter et al. |
| 2005/0201547 A1 | 9/2005 | Burg et al. |
| 2005/0210101 A1 | 9/2005 | Janik |
| 2005/0210143 A1 | 9/2005 | Wengrovitz |
| 2005/0213743 A1 | 9/2005 | Huet et al. |
| 2005/0240411 A1 | 10/2005 | Yacoub |
| 2005/0254632 A1 | 11/2005 | Pasquale et al. |
| 2005/0273781 A1 | 12/2005 | Nakamura et al. |
| 2005/0277431 A1 | 12/2005 | White |
| 2005/0278655 A1 | 12/2005 | Sims |
| 2005/0282582 A1 | 12/2005 | Slotznick |
| 2005/0288927 A1 | 12/2005 | Kim et al. |
| 2006/0002540 A1 | 1/2006 | Kreiner et al. |
| 2006/0003806 A1 | 1/2006 | Weber et al. |
| 2006/0018443 A1 | 1/2006 | Knott et al. |
| 2006/0023863 A1 | 2/2006 | Joseph et al. |
| 2006/0025995 A1 | 2/2006 | Erhart et al. |
| 2006/0026049 A1 | 2/2006 | Joseph et al. |

(56) References Cited

U.S. PATENT DOCUMENTS

| | | |
|---|---|---|
| 2006/0027097 A1 | 2/2006 | Lee |
| 2006/0031587 A1 | 2/2006 | Paterson et al. |
| 2006/0036437 A1 | 2/2006 | Bushey et al. |
| 2006/0039547 A1 | 2/2006 | Klein et al. |
| 2006/0050865 A1 | 3/2006 | Kortum et al. |
| 2006/0056287 A1 | 3/2006 | Paden et al. |
| 2006/0056406 A1 | 3/2006 | Bouchard et al. |
| 2006/0062375 A1 | 3/2006 | Pasquale et al. |
| 2006/0072737 A1 | 4/2006 | Paden et al. |
| 2006/0073013 A1 | 4/2006 | Emigholz et al. |
| 2006/0083357 A1 | 4/2006 | Howell et al. |
| 2006/0085538 A1 | 4/2006 | Newman et al. |
| 2006/0093097 A1 | 5/2006 | Chang |
| 2006/0100998 A1 | 5/2006 | Edwards et al. |
| 2006/0109974 A1 | 5/2006 | Paden et al. |
| 2006/0109976 A1 | 5/2006 | Sundaram et al. |
| 2006/0115070 A1 | 6/2006 | Bushey et al. |
| 2006/0126808 A1 | 6/2006 | Dallessandro et al. |
| 2006/0126811 A1 | 6/2006 | Bushey et al. |
| 2006/0133587 A1 | 6/2006 | Bushey et al. |
| 2006/0146806 A1 | 7/2006 | Khuc et al. |
| 2006/0153345 A1 | 7/2006 | Bushey et al. |
| 2006/0159116 A1 | 7/2006 | Gerszberg et al. |
| 2006/0159240 A1 | 7/2006 | Bushey et al. |
| 2006/0161431 A1 | 7/2006 | Bushey et al. |
| 2006/0165057 A1 | 7/2006 | Paden et al. |
| 2006/0165066 A1 | 7/2006 | Campbell et al. |
| 2006/0176824 A1 | 8/2006 | Laver et al. |
| 2006/0177040 A1 | 8/2006 | Mitra |
| 2006/0182252 A1 | 8/2006 | Harris et al. |
| 2006/0187954 A1 | 8/2006 | Braschi et al. |
| 2006/0188075 A1 | 8/2006 | Peterson |
| 2006/0188087 A1 | 8/2006 | Kortum et al. |
| 2006/0190424 A1 | 8/2006 | Beale et al. |
| 2006/0195312 A1 | 8/2006 | Knight et al. |
| 2006/0198505 A1 | 9/2006 | Kortum et al. |
| 2006/0215831 A1 | 9/2006 | Knott et al. |
| 2006/0215833 A1 | 9/2006 | Mahoney et al. |
| 2006/0251094 A1 | 11/2006 | Van Vleck et al. |
| 2006/0251229 A1 | 11/2006 | Gorti et al. |
| 2006/0256932 A1 | 11/2006 | Bushey et al. |
| 2006/0256952 A1 | 11/2006 | Rogers et al. |
| 2006/0256956 A1 | 11/2006 | Lee et al. |
| 2006/0285535 A1 | 12/2006 | Metcalf et al. |
| 2006/0291642 A1 | 12/2006 | Bushey et al. |
| 2006/0291644 A1 | 12/2006 | Ellinwood et al. |
| 2007/0019800 A1 | 1/2007 | Bushey et al. |
| 2007/0025528 A1 | 2/2007 | Knott et al. |
| 2007/0025542 A1 | 2/2007 | Bushey |
| 2007/0041551 A1 | 2/2007 | Whitecotten et al. |
| 2007/0047718 A1 | 3/2007 | Idler et al. |
| 2007/0047720 A1 | 3/2007 | Brandt et al. |
| 2007/0047728 A1 | 3/2007 | Raju et al. |
| 2007/0116230 A1 | 5/2007 | Brandt et al. |
| 2007/0136060 A1 | 6/2007 | Hennecke et al. |
| 2007/0192362 A1 | 8/2007 | Caballero et al. |
| 2007/0206734 A1 | 9/2007 | Hagale et al. |
| 2007/0206772 A1 | 9/2007 | Sato et al. |
| 2007/0260539 A1 | 11/2007 | Delinsky et al. |
| 2008/0008308 A1 | 1/2008 | Knott et al. |
| 2008/0048861 A1 | 2/2008 | Naidoo et al. |
| 2008/0049779 A1 | 2/2008 | Hopmann et al. |
| 2008/0084975 A1 | 4/2008 | Schwartz |
| 2008/0152094 A1 | 6/2008 | Perlmutter |
| 2008/0154601 A1 | 6/2008 | Stifelman et al. |
| 2008/0154773 A1 | 6/2008 | Ranzini et al. |
| 2008/0273687 A1 | 11/2008 | Knott et al. |
| 2009/0019141 A1 | 1/2009 | Bush et al. |
| 2009/0067590 A1 | 3/2009 | Bushey et al. |
| 2009/0171799 A1 | 7/2009 | Ying |
| 2009/0287484 A1 | 11/2009 | Bushey et al. |
| 2010/0040207 A1 | 2/2010 | Bushey et al. |
| 2010/0054449 A1 | 3/2010 | Bushey et al. |
| 2010/0232595 A1 | 9/2010 | Bushey et al. |
| 2013/0010947 A1 | 1/2013 | Bushey et al. |
| 2013/0058466 A1 | 3/2013 | Bushey et al. |
| 2013/0151253 A1 | 6/2013 | Bushey et al. |
| 2013/0230162 A1 | 9/2013 | Bushey |
| 2013/0294596 A1 | 11/2013 | Bushey et al. |

FOREIGN PATENT DOCUMENTS

| | | |
|---|---|---|
| EP | 0424015 B1 | 4/1991 |
| EP | 0671859 A2 | 9/1995 |
| EP | 0713345 A2 | 5/1996 |
| EP | 0876652 A4 | 6/1999 |
| GB | 2305078 A | 3/1997 |
| JP | 08163646 A | 6/1996 |
| JP | 08172673 A | 7/1996 |
| JP | 08294168 A | 11/1996 |
| JP | 08294170 A | 11/1996 |
| JP | 08317468 A | 11/1996 |
| JP | 08322087 A | 12/1996 |
| JP | 09037345 A | 2/1997 |
| JP | 09055981 A | 2/1997 |
| JP | 09084117 A | 3/1997 |
| JP | 09098476 A | 4/1997 |
| WO | 9405101 A1 | 3/1994 |
| WO | 9726612 A1 | 7/1997 |
| WO | 0137539 A2 | 5/2001 |
| WO | 0137539 A3 | 5/2001 |
| WO | 2004017584 A1 | 2/2004 |
| WO | 2004049222 A2 | 6/2004 |
| WO | 2005006713 A3 | 1/2005 |
| WO | 2005036330 A3 | 4/2005 |
| WO | 2005048577 A1 | 5/2005 |
| WO | 2006014195 A3 | 2/2006 |
| WO | 2006062707 A2 | 6/2006 |
| WO | 2006062854 A2 | 6/2006 |
| WO | 2006065526 A2 | 6/2006 |
| WO | 2007021444 A3 | 2/2007 |

OTHER PUBLICATIONS

International Search Report and Written Opinion of the International Search Authority for International Application No. PCT/US04/16017 from the International Searching Authority (EPO), mailed on Aug. 16, 2005, 5 pages.

International Search Report and Written Opinion of the International Search Authority for International Application No. PCT/US04/28260 from the International Searching Authority (EPO), mailed on Sep. 30, 2005, 7 pages.

International Search Report and Written Opinion of the International Search Authority for International Application No. PCT/US04/34239 from the International Searching Authority (EPO), mailed on Feb. 17, 2005, 7 pages.

International Search Report and Written Opinion of the International Search Authority for International Application No. PCT/US05/16449 from the International Searching Authority (EPO), mailed on Apr. 10, 2006, 7 pages.

International Search Report and Written Opinion of the International Search Authority for International Application No. PCT/US05/41473 from the International Searching Authority (EPO), mailed on Jun. 28, 2006, 4 pages.

International Search Report and Written Opinion of the International Search Authority for International Application No. PCT/US05/43126 from the International Searching Authority (EPO), mailed on Nov. 22, 2006, 4 pages.

International Search Report and Written Opinion of the International Search Authority for International Application No. PCT/US06/28349 from the International Searching Authority (EPO), mailed on Aug. 13, 2007, 5 pages.

"www.yahoo.com" from Dec. 12, 1998 as archived in the Internet archive (www.archive.org), 2 pages.

"Specification of the Bluetooth System: Profiles", Bluetooth, Part K:1 Generic Access Profile, Dec. 1, 1999, Specification vol. 2, Version 1.0 B, pp. 1-60.

(56) References Cited

OTHER PUBLICATIONS

Charny, B., "VoIP Phone Maker Plans a Cell Hybrid", http://news.cnet.com/2100-7352_3-5086177.html, CNET News, Oct. 3, 2003, pp. 1-2.

Chavez, A. et al., "Kasbah: An Agent Marketplace for Buying and Selling Goods", PAAM 96—Proceedings of the First International Conference on the Practical Application of Intelligent Agents and Multi-Agent Technology, Apr. 1996, Practical Application Co., pp. 75-90.

Crowston, K. et al., "The Effects of Linking on Genres of Web Documents", HICSS '99 Proceedings of the Thirty-Second Annual Hawaii International Conference on System Sciences—vol. 2, 1999, vol. 2, IEEE Computer Society, Washington, DC, p. 2006 (1-11).

Faiks, A. et al., "Gaining User Insight: A Case Study Illustrating the Card Sort Technique", Jul. 2000, College & Research Libraries, vol. 61, No. 4, pp. 349-357.

Haartsen, J., "Bluetooth: A New Radio Interface Providing Ubiquitous Connectivity", 2000 IEEE 51st Vehicular Technology Conference Proceedings, 2000, vol. 1, IEEE, Piscataway, NJ, pp. 107-111.

Moldovan, D. et al., "Using WordNet and Lexical Operators to Improve Internet Searches", IEEE Internet Computing, Jan.-Feb. 2000, vol. 4, Issue 1, IEEE Computer Society, Piscataway, NJ, pp. 34-43.

Ogino, T. et al., "Study of an Efficient Server Selection Method for Widely Distributed Web Server Networks," iNet 2000 Proceedings, www.isoc.org/inet2000/cdproceedings/1g/index.htm, Jun. 30, 2000, INet Japan Computer Society, 19 pages.

Schneiderman, R., "Bluetooth's Slow Dawn", IEEE Spectrum, Nov. 2000, vol. 37, Issue 11, IEEE Press, Piscataway NJ, pp. 61-65.

| SYNONYM TABLE | | |
|---|---|---|
| DETECTED SPEECH | SYNONYM | |
| | PREFERRED | SPECIFIC |
| NEED HELP USING | HOW TO USE | NEED HELP USING |
| I'D LIKE TO GET | ACQUIRE | I'D LIKE TO GET |
| DISCONNECT | CANCEL | DISCONNECT |
| I'D LIKE TO KNOW | INQUIRE | I'D LIKE TO KNOW |
| HOW MUCH | INQUIRE | HOW MUCH |
| CALLER ID | NAMED SERVICE | CALLER ID |
| CALL NOTES | NAMED SERVICE | CALL NOTES |
| CALL FORWARD | NAMED SERVICE | CALL FORWARDING |

FIG. 4

| | ACTIONS | | | | | |
|---|---|---|---|---|---|---|
| OBJECTS | ACQUIRE | CANCEL | CHANGE | INQUIRE | INFORM | HOW TO USE |
| DSL | X001 | X002 | X003 | X004 | | X005 |
| BASIC SERVICE | X006 | X007 | | X008 | | X009 |
| NAMED SERVICE | X010 | X011 | X013 | X014 | | X012 |
| BILL | | | | X015 | X016 | |
| PAYMENT | | X015 | X016 | X032 | | X033 |
| OTHER PROVIDERS | | | | X034 | | |
| COUPONS SPECIALS | | | | X035 | | |
| NAME / NUMBER | | | | X036 | | |
| STORE LOCATIONS | | | | X038 | X039 | |

FIG. 5

SYSTEM AND METHOD FOR SPEECH-ENABLED CALL ROUTING

CLAIM OF PRIORITY

This application is a continuation of, and claims priority from U.S. patent application Ser. No. 13/934,674, filed Jul. 3, 2013, and entitled "SYSTEM AND METHOD FOR SPEECH-ENABLED CALL ROUTING," which is a continuation of U.S. patent application Ser. No. 12/787,468, filed May 26, 2010, now issued as U.S. Pat. No. 8,503,662, and entitled "SYSTEM AND METHOD FOR SPEECH-ENABLED CALL ROUTING," which is a continuation of U.S. patent application Ser. No. 11/032,495, filed Jan. 10, 2005, now issued as U.S. Pat. No. 7,751,551, and entitled "SYSTEM AND METHOD FOR SPEECH-ENABLED CALL ROUTING," each of which is hereby incorporated by reference in its entirety.

FIELD OF THE DISCLOSURE

The present disclosure relates generally to speech recognition systems and more particularly to speech recognition-enabled automatic call routing systems and methods.

BACKGROUND

Speech recognition systems are specialized computers that are configured to process and recognize human speech and may also take action or carry out further processes. Developments in speech recognition technologies support "natural language" type interactions between automated systems and users. A natural language interaction allows a person to speak naturally. Speech recognition systems can react responsively to a spoken request. An application of natural language processing is speech recognition with automatic call routing (ACR). A goal of an ACR application is to determine why a person is calling a service center and to route the caller to an appropriate agent or destination for servicing a request. Speech recognition technology generally allows an ACR application to recognize natural language statements so that the caller does not have to rely on a menu system. Natural language systems allow the caller to state the purpose of their call "in their own words."

Natural language ACR systems attempt to interpret the intent of the caller based on the spoken language and then selects a routing destination. When a speech recognition system misinterprets the caller's intent, significant problems can result. A caller who is misrouted is generally unhappy. Misrouted callers realize that there has been a mistake with the automated phone service and often terminate the call by hanging up. If a caller does not hang up they will typically be routed to an operator who will attempt to manually route the call. Routing a caller to an undesired location and to human operators leads to considerable inefficiencies for a business. Most call routing systems handle a large volume of calls and, even if a small percentage of calls are abandoned, the costs associated with abandoned calls are significant. Accordingly, there is a need for an improved automated method and system of routing calls.

BRIEF DESCRIPTION OF THE DRAWINGS

FIG. 4 is a table that depicts speech input and mapped synonym terms; and

FIG. 5 is a table illustrating action-object pairs and call destinations relating to the action-object pairs.

DETAILED DESCRIPTION OF THE DRAWINGS

Figure 1:
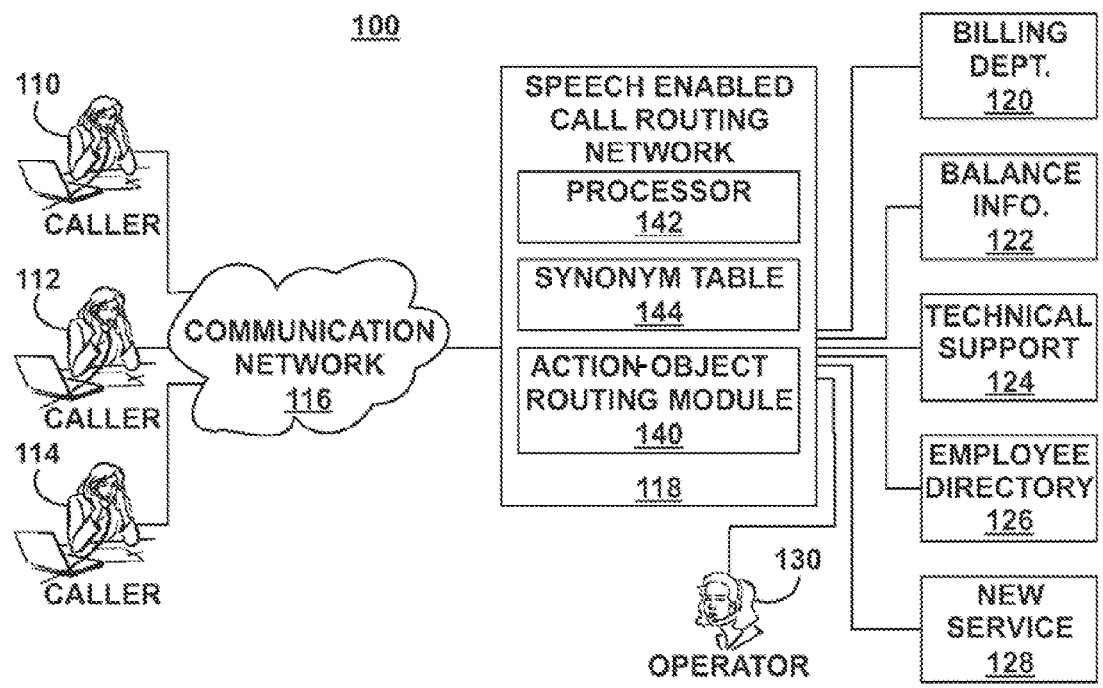
FIG. 1 illustrates a simplified configuration of a telecommunication system.

In a particular embodiment, a method includes receiving speech of a call from a caller at a processor of a call routing system. The method includes using the processor to determine a first call destination for the call based on the speech. The method includes using the processor to determine whether the caller is in compliance with at least one business rule related to an account of the caller. The method includes routing the call to the first call destination with the processor when the caller is in compliance with the at least one business rule. The method also includes routing the call to a second call destination with the processor when the caller is not in compliance with the at least one business rule.

In a particular embodiment, a method includes transforming speech of a call received from a caller into text using a processor. The method includes converting the text into an object and an action with the processor. The method includes determining, with the processor, a first call destination based on the object and the action. The method includes determining, with the processor, whether the caller is in compliance with a first business rule related to an account of the caller. The method also includes routing the call to a second call destination with the processor when the caller is not in compliance with the first business rule.

In a particular embodiment, a system including a processor and a network interface to receive speech input of a call from a caller. The system includes an action-object routing module executable by the processor to determine a first call destination based on the speech input. The system also includes a business rule module executable by the processor to determine whether the caller is in compliance with a business rule related to payment of an account of the caller. The system routes the call to a second call destination when the caller is not in compliance with the business rule and the system routes the call to the first destination when the caller is in compliance with the business rule.

A method of processing a call is disclosed. The method can transform speech input from a caller of a call into text and convert the text into an object and an action. The method determines a call destination based on the object and the action. The method can route the call to a destination when a caller is not in compliance with at least one business rule. The method can further route the call to the call destination when the caller is in compliance.

In a particular embodiment, the system includes a call routing system that has a processor configured to convert speech input from a caller into an object and an action. The system has an action-object routing module configured to determine a first destination for the call based on the object and the action. The call routing system can route the call to a second destination when the caller is not in compliance with a business rule.

In another embodiment the communication system includes an acoustic model configured to accept speech input and to produce text and a semantic model coupled to the acoustic model for producing an action and an object responsive to the text. The system further includes a routing module table responsive to the semantic model to provide a routing destination based on the action and the object.

Referring now to FIG. 1, an illustrated communications system 100 that includes a call routing support system is shown. The communications system 100 includes a speech-enabled call routing system (SECRS) 118, such as an interactive voice response system having a speech recognition module. The communications system 100 includes a plurality of potential call destinations. Illustrative call destinations shown include service departments, such as billing department 120, balance information 122, technical support 124, employee directory 126, and new customer service departments 128. The system 100 includes a communication network 116 that receives calls from a variety of callers, such as the illustrated callers 110, 112, and 114. In a particular embodiment, the communication network 116 may be a public telephone network or may be provided by a voice over Internet protocol (VoIP) type network. The SECRS 118 may include components, such as a processor 142, a synonym table 144, and an action-object routing module 140. The SECRS 118 is coupled to and may route calls to any of the destinations, as shown. In addition, the SECRS 118 may route calls to an agent, such as the illustrated live operator 130. An illustrative embodiment of the SECRS 118 may be a call center having a plurality of agent terminals attached. Thus, while only a single operator 130 is shown, it should be understood that a plurality of different agent terminals or types of terminals may be coupled to the SECRS 118, such that a variety of agents may service incoming calls. In addition, the SECRS 118 may be an automated call routing system. In a particular embodiment, the action-object routing module 140 includes an action-object lookup table for matching action-object pairs to desired call routing destinations.

Figure 2:
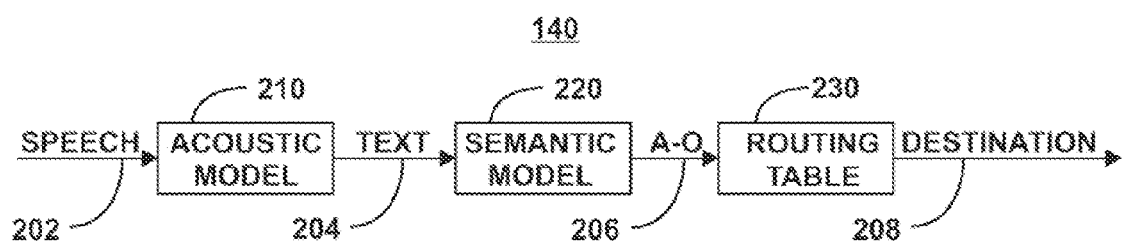
FIG. 2 is a general diagram that illustrates a method of routing calls.

Referring to FIG. 2, an illustrative block diagram of the SECRS 118 is depicted. In this particular embodiment, the processor 142 in the SECR 118 includes an acoustic model 210, a semantic model 220, and an action-object routing table 230. The acoustic model 210 receives speech input 202 and provides text as its output 204, and the semantic model 220 receives text 204 from the acoustic model 210 and produces an action-object pair. The actions and objects in the action-object table are ordered or ranked according to a confidence level. A confidence level indicates how likely a particular action or object reflects a correct and useable caller instruction. A call can be routed based on the overall highest confidence level action and object in an action-object list in the routing table 230. An exemplary routing table is depicted in FIG. 5. Objects are listed on the left side of the chart and actions are listed across the top of the chart. If the action of "acquire" has the highest confidence level for an action and "DSL" has the highest confidence level for an object, then the call would be routed to extension "001" according to the intersection in the table of the action-object pair "acquire-DSL." As a further example, when the action-object pair of "cancel-DSL" is selected, then the call would be routed to extension "002" according to the routing table. In the event that a confidence level for an action-object pair is below a predetermined level, the call may be routed to a human operator or agent terminal.

The routing table 230 can receive a selected action-object pair 206 from the semantic model 220 and produces a desired call routing destination 208. Based on the call routing destination 208, a call received at the SECRS 118 may be routed to a destination, such as billing department 120 or technical support service destination 124, as shown in FIG. 1. In a particular embodiment, the action-object routing table 230 may be a look-up table or a spreadsheet, such as Microsoft Excel™.

Figure 3:
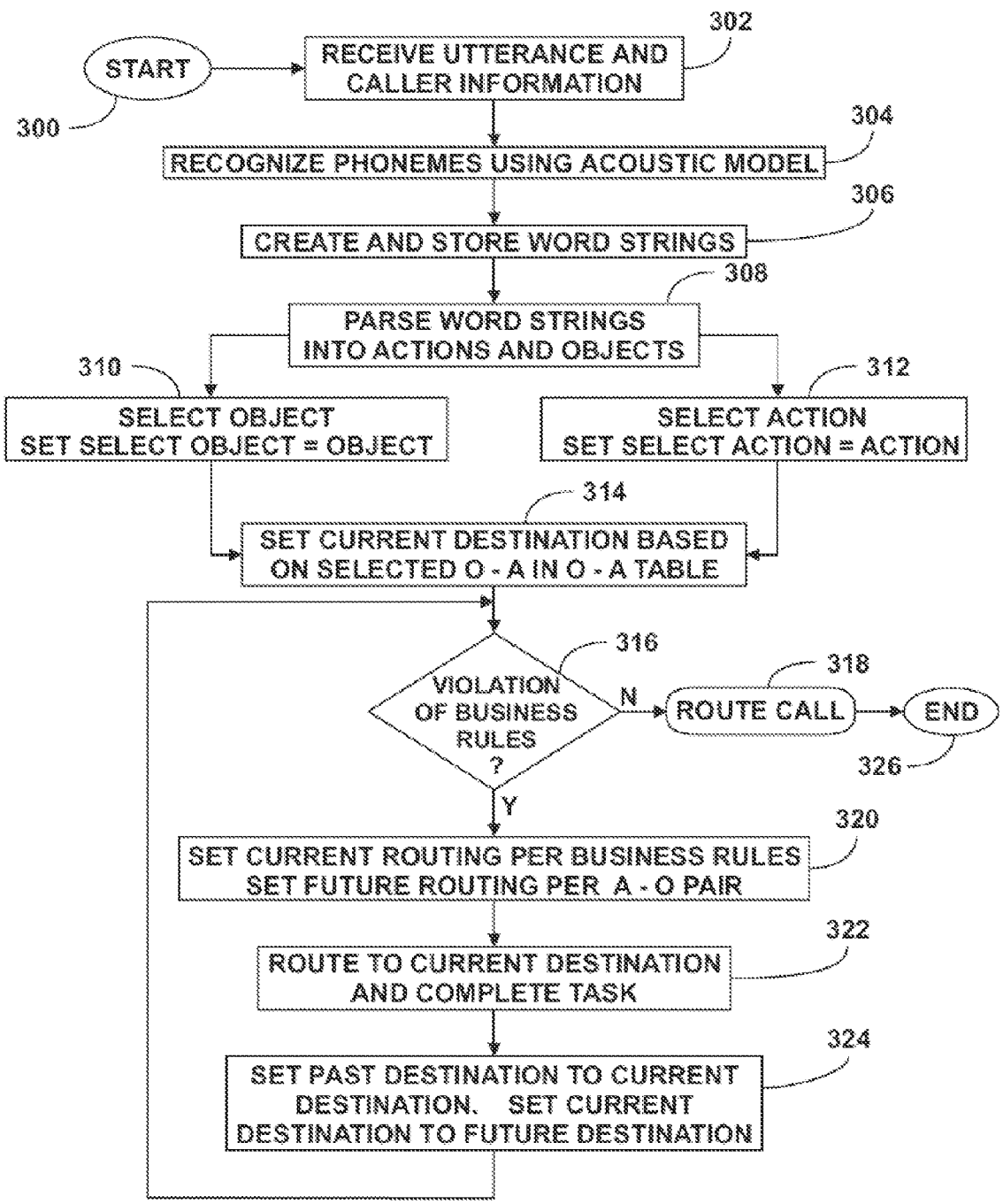
FIG. 3 is a flow diagram that illustrates a method of processing and routing calls.

Referring to FIG. 3, an illustrative embodiment of a method of processing a call using an automated call routing system, such as the system of FIG. 1, is illustrated. The method starts at 300 and proceeds to step 302 where a speech input signal, referred to as an utterance, is received or detected. Information about the caller is also received, such as information that can identify the caller or the caller's account number. This information can be automatically provided or it can be requested using a voice prompt and received as part of the utterance or as touchtone input. Using phonemes, the received speech input is converted into a plurality of word strings or text in accordance with an acoustic model, as shown at steps 304 and 306. In a particular embodiment, confidence levels are assigned to word strings based on established rules and the content and coherency of the word string. Next, at step 308, the word strings are parsed into actions and objects. Objects generally represent nouns and adjective-noun combinations while actions generally represent verbs and adverb-verb combinations. The actions and objects are assigned confidence values based on how likely they are to reflect the intent of the caller.

Many possible actions and objects may be detected or created from the word strings. To aid in the selection of a particular action and object, a table such as a synonym table can be utilized, as shown in FIG. 4. The synonym table can store natural language phrases and map the phrases to a predetermined list of actions and objects. Textual conversion of the natural language spoken by the caller in the acoustic model can be compared to natural language phrases in the table based on the phonetic-to-text conversion. Using the synonym table, the system and method maps portions of the natural phrases to at least one action or at least one object.

Additionally, the synonym table can provide rules for distinguishing recognized actions and recognized objects from specific actions and specific objects. Generally, there may be numerous actions that map to the same destination and numerous objects that map to the same destination. For example, in FIG. 4, the recognized object "Named Services" can include specific objects, such as "Caller ID," "Call Notes," "Call Forward" and other features or services that a single call service department may process. Thus, when a call request creates a recognized action or recognized object from a class of possible actions or objects, the call can be routed based on the recognized and selected action or the recognized and selected object. The specific action or specific object can be stored and transmitted with the call such that a destination system can utilize the action or object to assist the caller and meet the caller's objectives.

Recognized actions and objects can be assigned a confidence level based on textual similarities between predetermined or known actions and objects and results of the phonetic conversion. Additionally, rules that are based on consistency between a recognized action or an object and known phonemes can also be utilized to determine the confidence level. The method selects a most probable action and object from a list of recognized objects and actions utilizing the confidence levels, as is illustrated in steps 310 and 312. The selected action and selected object are paired and a current routing destination is determined at step 314. The method can track the treatment of the call utilizing three variables known as prior routing destination, current routing destination, and future routing destination. The prior routing destination variable refers to a previous location having processed the call, the current routing destination refers to a present location that is processing the call, and the future routing destination variable refers to where the call may be routed for processing. The variables can be set and reset throughout the process, as the call is routed, possibly among call centers. Thus, after an initial action object selection, the variables may be as follows: future routing destination equals null; prior routing destination equals null; current routing destination equals action-object table selection results.

Using the caller information received, the method determines if the caller is violating or has violated any business rules at decision step 316. For example, if a caller is late on their payment, or has a voice message box that has been full for over two months, the method may determine that the caller has violated a business rule. When a business rule has been violated, the call can be routed to a destination or a call service department determined by the business rules, as shown in step 320. When the call is transferred to a call service department that can overcome the rule violation, the variable can be reset as follows: (future routing destination equals table results; current routing destination equals business rules table; prior routing destination equals null). The call is routed to the current routing destination at step 322 and the caller is encouraged to take action to comply with the business rule that has been violated. After an attempt has been made to comply with the violation, the variables are reset (prior routing destination equals current routing destination; current routing destination equals future routing destination; future routing destination equals null), at step 324. The method proceeds back to decision step 316 to determine if the caller remains in violation of at least one business rule. If the caller is not in violation of a business rule, then the call is routed to the caller's desired destination, at step 318, the call routing destination variables are reset, and the method ends at step 326.

The above-disclosed subject matter is to be considered illustrative, and not restrictive, and the appended claims are intended to cover all such modifications, enhancements, and other embodiments that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   determining, at a processor, a first destination based on text that is generated based on a communication associated with a source, wherein an account is associated with the source, wherein the text is generated based on transforming speech included in the communication;
   determining a storage value associated with the account, wherein the storage value is associated with an amount of used storage associated with the account; and
   routing the communication based on a comparison of the storage value to a storage capacity associated with the account.

2. The method of claim 1, further comprising routing the communication to the first destination when the storage value is less than the storage capacity.

3. The method of claim 1, further comprising routing the communication to a second destination when the storage value is greater than or equal to the storage capacity.

4. The method of claim 1, further comprising:
   generating the text based on the communication;
   converting the text into an object and an action; and
   identifying the first destination based on the object and the action.

5. A system comprising:
   a network interface;
   a processor; and
   a memory that includes instructions executable by the processor to perform operations including:
      receiving a storage value associated with an account in response to text that is generated based on a communication received from a source via the network interface, wherein the account is associated with the source; and
      routing the communication to a first destination based on a comparison of the storage value to a storage capacity associated with the account, wherein the first destination is determined based on the text, and wherein the text is generated based on transforming speech included in the communication.

6. The system of claim 5, wherein the memory includes an action-object routing module executable by the processor to determine a routing destination based on speech received as part of the communication.

7. The system of claim 6, wherein the processor, while executing the action-object routing module, has access to a synonym table and a routing table.

8. A method comprising
   receiving a storage value associated with an account in response to text that is generated based on a communication associated with a source, wherein the account corresponds to the source; and
   routing the communication to a first destination based on a comparison of the storage value to a data storage capacity associated with the account, wherein the first destination is determined based on the text, and wherein the text is generated based on transforming speech included in the communication.

9. The method of claim 8, wherein the communication includes a voice call.

10. The method of claim 8, wherein the storage value corresponds to a status of a data storage device.

11. The method of claim 10, wherein the status indicates that the data storage capacity is full.

12. The method of claim 10, wherein the data storage capacity corresponds to a voice message capacity.

13. The method of claim 8, wherein the account is associated with the source by a numerical identifier.

14. The method of claim 8, wherein the storage value corresponds to a time period.

15. The method of claim 8, further comprising identifying the first destination based on an audio input signal.

16. The method of claim 8, further comprising routing the communication to a second destination based on a determination that the storage value is greater than or equal to the data storage capacity.

17. The method of claim 16, further comprising, in response to a change in a payment status, routing the communication from the second destination to the first destination.

18. The method of claim 8, further comprising, after a determination that the storage value is greater than or equal to the data storage capacity, determining a payment status associated with the account.

19. The method of claim 18, further comprising routing the communication based on the payment status.

* * * * *